United States Patent
Aoyama et al.

(10) Patent No.: US 9,884,467 B2
(45) Date of Patent: *Feb. 6, 2018

(54) COPPER-BASED MATERIAL AND METHOD FOR PRODUCING THE SAME

(71) Applicant: Hitachi Cable, Ltd., Tokyo (JP)

(72) Inventors: Seigi Aoyama, Kita-Ibaraki (JP); Hideyuki Sagawa, Tokaimura (JP); Toru Sumi, Hitachi (JP); Keisuke Fujito, Mito (JP); Hiromitsu Kuroda, Hitachi (JP)

(73) Assignee: HITACHI CABLE, LTD., Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 13/904,950

(22) Filed: May 29, 2013

(65) Prior Publication Data

US 2013/0323532 A1 Dec. 5, 2013

(30) Foreign Application Priority Data

Jun. 1, 2012 (JP) ................. 2012-125861

(51) Int. Cl.
| | | |
|---|---|---|
| B32B 15/01 | (2006.01) | |
| C22C 9/00 | (2006.01) | |
| C22C 9/04 | (2006.01) | |
| C25D 5/50 | (2006.01) | |
| C25D 7/00 | (2006.01) | |
| C25D 3/22 | (2006.01) | |

(52) U.S. Cl.
CPC ........... *B32B 15/01* (2013.01); *C22C 9/00* (2013.01); *C22C 9/04* (2013.01); *C25D 5/50* (2013.01); *C25D 7/00* (2013.01); C25D 3/22 (2013.01); Y10T 428/12799 (2015.01); Y10T 428/12903 (2015.01)

(58) Field of Classification Search
None
See application file for complete search history.

(56) References Cited

U.S. PATENT DOCUMENTS

| | | | |
|---|---|---|---|
| 3,729,294 A * | 4/1973 | Hibbs, Jr. ............... | 428/626 |
| 4,376,154 A * | 3/1983 | Nakatsugawa ............ | 428/607 |
| 5,709,958 A | 1/1998 | Toyoda et al. | |
| 2005/0127364 A1* | 6/2005 | Inoue .................. | C22C 5/06 257/72 |

(Continued)

FOREIGN PATENT DOCUMENTS

| | | |
|---|---|---|
| CN | 1322857 A | 11/2001 |
| JP | 62-40361 A | 2/1987 |

(Continued)

OTHER PUBLICATIONS

Park et al. Surface and Coating Technology, 200, 2005, 77-82.*

(Continued)

*Primary Examiner* — Vera Katz (74) *Attorney, Agent, or Firm* — McGinn IP Law Group, PLLC.

(57) ABSTRACT

A copper-based material includes a base comprising copper and a surface treatment layer disposed on a surface of the base, the surface treatment layer including an amorphous layer containing a metal element that has a greater affinity for oxygen than for copper, oxygen, and, optionally, copper diffused from the base.

11 Claims, 3 Drawing Sheets

(56) References Cited

U.S. PATENT DOCUMENTS

| | | |
|---|---|---|
| 2009/0053555 A1 | 2/2009 | Nose et al. |
| 2010/0263905 A1* | 10/2010 | Aoyama .............. B22D 21/025 174/107 |
| 2011/0123729 A1* | 5/2011 | Lee .................. G02F 1/133512 428/1.6 |
| 2012/0318361 A1* | 12/2012 | Teeter ................ H01L 31/0326 136/264 |
| 2014/0209349 A1* | 7/2014 | Sagawa et al. ........... 174/110 R |

FOREIGN PATENT DOCUMENTS

| | | | |
|---|---|---|---|
| JP | 01205065 A | * | 8/1989 |
| JP | 2001-59198 A | | 3/2001 |
| JP | 2004-176082 A | | 6/2004 |
| JP | A-2007-208263 | | 8/2007 |
| JP | 2008-45203 A | | 2/2008 |
| JP | 2010-163641 A | | 7/2010 |
| WO | WO2007/108496 A1 | | 9/2007 |

OTHER PUBLICATIONS

Shoji et. al. JP 62-040361 Feb. 21, 1987, p. 1-9. Human Translation.*
JP 2007-208263 A Aug. 16, 2007 Machine Translation.*
Alford et.al. Appl. Phys. Lett. 94, 2009, 1-3.*
Japanese Office Action dated Dec. 2, 2014 with an English Translation thereof.
Chinese Office Action dated Apr. 25, 2016 with an English translation.
Japanese Office Action, dated May 13, 2016, and English translation thereof.

* cited by examiner

COPPER-BASED MATERIAL AND METHOD FOR PRODUCING THE SAME

The present application is based on Japanese patent application No. 2012-125861 filed on Jun. 1, 2012, the entire contents of which are incorporated herein by reference.

BACKGROUND OF THE INVENTION

1. Field of the Invention

The present invention relates to a copper-based material used as a decorative material or as a conductive material, in which, by providing a thin surface treatment layer composed of a metal element different from copper on the surface of a copper or copper alloy base, discoloration and oxidation of the surface can be suppressed, and a method for producing the same.

2. Description of the Related Art

In everyday life, there are various goods (houses, furniture, cars, home appliances, tools, luxury goods, accessories, daily goods, and the like). The factors that determine the values of these goods include, in addition to practicality and functionality, the aesthetic aspect. In decorative items in which the aesthetic aspect is important, shape, color, gloss, and the like are factors that enhance the values of such decorative items. Pure copper-based materials, whose pale pink color and shine have been appreciated for a long time, have been used as decorative materials.

Furthermore, since copper has a high electrical conductivity, second only to silver, it has been used as various conductive members, such as cables. Typical examples of a pure copper-based conductor include oxygen-free copper and tough pitch copper. Pure copper-based conductors are used as a wire-shaped or sheet-shaped material or as plating.

By applying an anticorrosive, such as benzotriazole, to the surface of copper materials for decorative use, oxidation of the copper materials is suppressed. When such copper materials are left to stand in an atmospheric environment, their color and shine degrade with time, and the original aesthetic aspect of pure copper is lost. In the case of copper, an initial oxide film which is a natural oxide film with a thickness of several nanometers is generated. After that, even an increase in the thickness of the oxide film to several tens of nanometers would change the color tone of the exterior markedly and degrade the shine. The reason for this is that oxides mainly containing copper and oxygen bonded to each other ($Cu_2O$ and $CuO$) are formed on the surface of the copper, and the thickness of the resulting oxide film increases with time.

On the other hand, a way of improving the corrosion resistance has been proposed in which a copper material is alloyed by adding an additive element. Furthermore, there has been proposed a method for producing a copper-based member having corrosion resistance in which the surface of a copper material is subjected to zinc (Zn) plating, and then diffusion treatment is performed to form a copper-zinc (Cu—Zn) layer having a zinc (Zn) concentration of 10% to 40% (for example, refer to Japanese Unexamined Patent Application Publication No. 62-040361).

However, as a result of studies by the present inventors, it has been found that, even when such a copper-based member is used, for example, in the case where the copper-based member is used as cable conductors for power and signal transmission for automobile or vehicle use in which the ambient temperature or the sum of the ambient temperature and the operating temperature is 100° C. or higher, the performance required for products, i.e., corrosion resistance (oxidation resistance) for high-temperature, long-term use, is still not completely satisfactory.

Furthermore, in recent years, it has been reported that since amorphous alloys have a structure in which atoms are densely packed, they exhibit excellent corrosion resistance (for example, refer to International Publication No. 2007/108496, and Japanese Unexamined Patent Application Publication Nos. 2008-045203, 2004-176082, 2001-059198, and 2010-163641).

Although amorphous alloys are advantageous in terms of excellent corrosion resistance, they have a drawback in that, since it is necessary to use materials that have been alloyed using a plurality of metal elements, the production process becomes complicated. Techniques for forming amorphous layers using non-alloy zinc have not been fully studied yet.

SUMMARY OF THE INVENTION

In view of the foregoing and other exemplary problems, drawbacks, and disadvantages of the conventional methods and structures, and exemplary feature of the present invention is to provide a copper-based material and method for producing the same.

In a first aspect of the present invention, described herein is a copper-based material which has corrosion resistance (oxidation resistance) that withstands a long-term use in a high-temperature environment and in which an amorphous layer can be formed by a simple process, and a method for producing the same.

In order to achieve the object described above, the present invention provides the following copper-based material and method for producing the same.

(1) According to one exemplary aspect of the invention, a copper-based material includes a base mainly composed of copper and a surface treatment layer disposed on a surface of the base, the surface treatment layer including an amorphous layer containing a metal element that has a greater affinity for oxygen than for copper, and oxygen.

In the above exemplary invention (1), many exemplary modifications and changes can be made as below (the following exemplary modifications and changes can be made).

(2) In the copper-based material according to the item (1), the amorphous layer constituting the surface treatment layer may further contain copper diffused from the base.

(3) In the copper-based material according to the item (1), the surface treatment layer may include, under the amorphous layer, a diffusion layer composed of copper and a metal element that has a greater affinity for oxygen than for copper, or a diffusion layer composed of copper, a metal element that has a greater affinity for oxygen than for copper, and oxygen.

(4) In the copper-based material according to any one of the items (1), the metal element that has a greater affinity for oxygen than for copper may be zinc.

(5) In the copper-based material according to any one of the items (1), the surface treatment layer may have a thickness of 3.0 nm to 0.6 µm.

(6) According to another exemplary aspect of the invention, a method for producing a copper-based material includes forming a coating layer composed of a metal element that has a greater affinity for oxygen than for copper with a thickness of 0.5 µm or less on a surface of a base mainly composed of copper, and subjecting the resulting coating layer to heat treatment at a temperature of 50° C. to 150° C. for 30 seconds to 60 minutes to form a surface treatment layer.

The above exemplary modifications may be alone or in any combination thereof.

(7) In the method for producing a copper-based material according to the item (6), the metal element that has a greater affinity for oxygen than for copper may be zinc.

(8) In the method for producing a copper-based material according to the item (6), the surface treatment layer may have a thickness of 3.0 nm to 0.6 μm.

According to the present invention, it is possible to provide a copper-based material which has corrosion resistance (oxidation resistance) that withstands a long-term use in a high-temperature environment and in which an amorphous layer can be formed by a simple process, and a method for producing the same.

BRIEF DESCRIPTION OF THE DRAWINGS

The foregoing and other exemplary purposes, aspects and advantages will be better understood from the following detailed description of the invention with reference to the drawings, in which.

DESCRIPTION OF THE EXEMPLARY EMBODIMENTS

Referring now to the drawings, and more particularly to FIGS. 1-5, there are shown exemplary embodiments of the methods and structures according to the present invention.

Although the invention has been described with respect to several exemplary embodiments for complete and clear disclosure, the appended claims are not to be thus limited but are to be construed as embodying all modifications and alternative constructions that may occur to one skilled in the art which fairly fall within the basic teaching herein set forth.

Further, it is noted that, Applicant's intent is to encompass equivalents of all claim elements, even if amended later during prosecution.

A copper-based material according to an embodiment of the present invention includes a base mainly composed of copper and a surface treatment layer disposed on a surface of the base, the surface treatment layer including an amorphous layer, in which the amorphous layer contains a metal element that has a greater affinity for oxygen than for copper (e.g., zinc), oxygen, and, optionally, copper diffused from the base.

Figure 1:
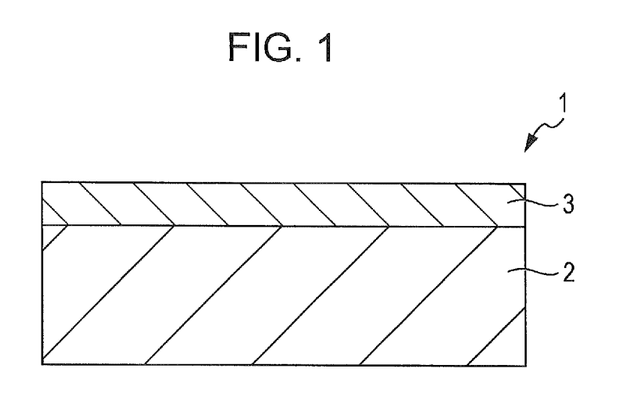
FIG. 1 is a cross-sectional view schematically showing a copper-based material according to an embodiment of the present invention.

Embodiments of the present invention will be described below with reference to the drawings. FIG. 1 is a cross-sectional view schematically showing a copper-based material according to an embodiment of the present invention.

As shown in FIG. 1, a copper-based material 1 according to this embodiment includes a base 2 mainly composed of copper and a surface treatment layer 3 including an amorphous layer disposed on the surface of the base 2. The amorphous layer, for example, contains a metal element that has a greater affinity for oxygen than for copper (e.g., zinc) and oxygen, or contains a metal element that has a greater affinity for oxygen than for copper (e.g., zinc), oxygen, and copper diffused from the base 2. It is believed that the amorphous layer in which elements are randomly arranged has a dense structure compared with the crystalline layer in which elements are orderly arranged, and therefore, the amorphous layer serves as a barrier layer that inhibits the diffusion of copper to the surface of the surface treatment layer, which causes oxidation of the copper material, or penetration of oxygen into the copper material and consequent bonding between copper and oxygen.

In order to form the amorphous layer, it is required that oxygen and the element other than copper preferentially bind to each other. In order to promote the formation of the amorphous layer, it is preferable that a metal element (e.g., zinc) having a greater affinity for oxygen than for copper constituting the base 2 be disposed on the surface of the base.

Figure 2:
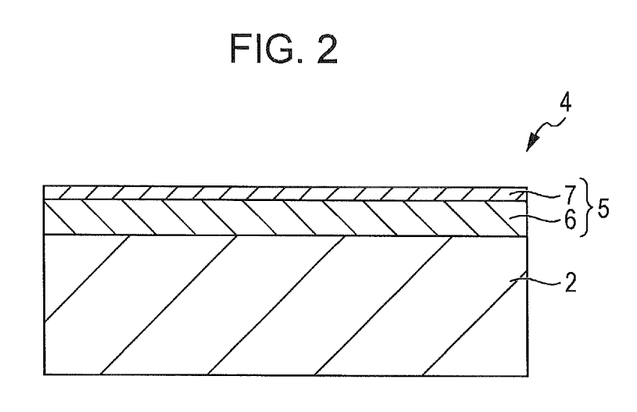
FIG. 2 is a cross-sectional view schematically showing a copper-based material according to another embodiment of the present invention.

Furthermore, as shown in FIG. 2, a copper-based material 4 according to another embodiment of the present invention may have a structure in which a surface treatment layer 5 includes an amorphous layer 7 and a diffusion layer 6 composed of copper and a metal element that has a greater affinity for oxygen than for copper (e.g., zinc) or a diffusion layer 6 composed of copper, a metal element that has a greater affinity for oxygen than for copper, and oxygen, which is disposed under the amorphous layer 7.

The copper-based material according to each of the embodiments described above has extensive corrosion resistance (oxidation resistance) in either use for decorative members or use for conductive members, and in particular, has corrosion resistance (oxidation resistance) that withstands a long-term use in a high-temperature environment.

The structure of the copper-based material according to this embodiment will be described more specifically below.

The thickness of the surface treatment layer 3 used in the copper-based material 1 according to this embodiment (the surface treatment layer 5 in the case of the copper-based material 4 including the diffusion layer 6) is preferably 3.0 nm to 0.6 μm, and is more preferably 3.0 nm to 0.5 μm, although it depends on the thickness of the diffusion layer 6 and the heat treatment conditions.

Furthermore, in the case where the diffusion layer 6 is included, the thickness of the amorphous layer 7 is not particularly limited, but is preferably 3.0 nm or more.

Furthermore, the lower limit of the thickness of the diffusion layer 6 is not particularly limited as long as the copper core (base) is coated with the diffusion layer 6. The practical lower limit of the coating thickness is about 3 nm.

Furthermore, the thickness of the diffusion layer 6 is preferably 0.5 μm or less. If the thickness exceeds 0.5 μm, it may become difficult to stably form the amorphous layer 7 which contributes to demonstration of high corrosion resistance.

Examples of the metal element that has a greater affinity for oxygen than for copper, constituting the surface treatment layer 3, i.e., the amorphous layer (the amorphous layer 7 in the case where the diffusion layer 6 is included) include Ti, Mg, Al, Fe, Sn, and Mn, in addition to zinc. In particular, from the recycling standpoint, Ti and Mg are preferable because removal by oxidation can be easily performed in the copper production process.

The material mainly composed of copper constituting the base 2 is not necessarily pure copper. A copper alloy can also be used as long as the effects of the present invention can be obtained. For example, oxygen-free copper, tough pitch copper, or the like can be used. Specific examples that can be used include dilute copper alloys containing 3 to 15 ppm by mass of sulfur, 2 to 30 ppm by mass of oxygen, and 5 to 55 ppm by mass of Ti.

Furthermore, since the surface treatment layer 3 or 5 includes a diffusion layer in which different elements are in contact with each other at an interface, a gradual change in concentration generally occurs at the interface, and it is difficult to define the thickness of the surface treatment layer.

Furthermore, the copper-based material of the present invention can also be applied to cables including conductors for high-frequency applications, antennas, conductors for high-frequency coaxial cables, flexible elliptic waveguides, and the like.

Furthermore, in the method for producing a copper-based material according to the present invention, as described above, it is preferable to subject the coating layer to heat treatment at a temperature of 50° C. to 150° C. for 30 seconds to 60 minutes. Furthermore, in order to form the Zn layer, plating can be preferably used. Besides plating, sputtering, vapor deposition, cladding, or the like may be used.

EXAMPLES

The present invention will be described more specifically below with reference to examples. Table 1 summarizes Examples 1 to 6 of the present invention and Comparative Examples 1 to 5.

TABLE 1

| | | Material | Thickness of surface treatment layer: μm | Presence of amorphous layer | Appearance (color, shine) 100° C. | Appearance (color, shine) 85° C. × 85% | Corrosion resistance | Comprehensive evaluation |
|---|---|---|---|---|---|---|---|---|
| Examples | 1 | Zn/Cu | 0.003 | Present | ○ | ○ | ○ | ○ |
| | 2 | Zn/Cu | 0.006 | Present | ⊙ | ⊙ | ⊙ | ⊙ |
| | 3 | Zn/Cu | 0.01 | Present | ⊙ | ⊙ | ⊙ | ⊙ |
| | 4 | Zn/Cu | 0.05 | Present | ⊙ | ⊙ | ⊙ | ⊙ |
| | 5 | Zn/Cu | 0.1 | Present | ○ | ○ | ○ | ○ |
| | 6 | Zn/Cu | 0.5 | Present | ○ | ○ | ○ | ○ |
| Comparative Examples | 1 | Zn/Cu | 1.0 | Not present | X | X | X | X |
| | 2 | Zn/Cu | 0.02 | Not present | Δ | X | ○ | X |
| | 3 | Zn/Cu | 0.02 | Not present | X | X | X | X |
| | 4 | Cu | — | Not present | X | X | X | X |
| | 5 | Cu—Zn alloy | — | Not present | Δ | Δ | Δ | X |

Accordingly, in the present invention, the thickness of the surface treatment layer is defined as "the thickness of the layer containing a metal element that has a greater affinity for oxygen than for copper, oxygen, and optionally copper, in which the content in terms of atomic concentration of each of the elements constituting the layer is 2 atomic percent or more".

Regarding the copper-based material according to this embodiment, in the case where the metal element that has a greater affinity for oxygen than for copper is, for example, zinc, by forming a Zn layer by electrolytic plating on the surface of a copper-based conductor in a size and shape of a final product, and then directly heating in the air at a temperature of 50° C. to 150° C. for 30 seconds to 60 minutes, it is possible to produce a copper-based material having a surface treatment layer including an amorphous layer containing at least zinc and oxygen. That is, an amorphous layer can be formed by a simple process in which the surface of a base mainly composed of copper is coated with zinc, and predetermined heat treatment is simply performed. In addition, the surface treatment layer may be formed on one surface or both surfaces of the base.

According to another embodiment, a copper-based material may be produced by a method in which zinc plating is performed in advance before the material is formed into the size and shape of a final product, and then the size and shape of the final product are formed such that the thickness of the coating layer is 0.5 μm or less.

The copper-based material of the present invention can be applied to conductive materials, decorative materials, such as ornaments and dial plates, and the like.

The details of Examples 1 to 6 and Comparative Examples 1 to 5 will be described later. Roughly speaking, the copper-based materials of Examples 1 to 6 and Comparative Examples 1 to 5 shown in Table 1 were each produced by forming a zinc coating layer with various thickness on a plate composed of copper as a base.

That is, the copper-based materials of Examples 1 to 6 were each produced by forming a coating layer by zinc plating with various thickness, in the range of 0.002 to 0.45 μm, on a plate composed of tough pitch copper, followed by annealing in the air.

Furthermore, in the copper-based material of Comparative Example 1, in order to evaluate the influence of the thickness of the zinc layer on the characteristics of the copper-based material, a zinc layer with a different thickness was formed, and then the same heat treatment as that in Example 1 was performed. In Comparative Examples 2 and 3, in order to evaluate the influence of the heat treatment conditions on the characteristics of the copper-based materials, the copper-based materials were produced by changing the heat treatment conditions (Comparative Example 2) or without performing heat treatment (Comparative Example 3).

Furthermore, in Comparative Examples 4 and 5, tough pitch copper (Comparative Example 4) and a Cu-30 mass % Zn alloy (Comparative Example 5) were prepared.

Results of the confirmation of the presence of the amorphous layer by reflection high energy electron diffraction (RHEED) analysis are shown in Table 1. The copper-based materials in which a halo pattern indicating the presence of the amorphous layer was confirmed were shown as "present". The copper-based materials in which electron diffraction spots indicating the crystalline structure were confirmed were shown as "not present".

In Table 1, evaluation of the appearance and corrosion resistance and comprehensive evaluation of each of the copper-based materials were performed as described below.

The "appearance" was evaluated by carrying out an isothermal holding test in which test samples were held in the air for 1,000 hours in a thermostatic chamber set at 100° C. and a test in which the test samples were held in a testing chamber at a temperature of 85° C. and a humidity of 85% for 100 hours. The changes in color and shine before and after the test were checked. Test samples with the least change were evaluated to be excellent (⊚), test samples with the most change and degradation in appearance were evaluated to be poor (X), and test samples in-between were evaluated to be unsatisfactory (Δ).

The "corrosion resistance" was evaluated by a test in which the test samples were held in the air for 1,000 hours in a thermostatic chamber set at 100° C., and the increment of the oxide film thickness measured after the test was evaluated. Test samples with the least change compared to the initial stage (before the test) were evaluated to be excellent (⊚), test samples with the most change and degradation were evaluated to be poor (X), and test samples in-between were evaluated, according to the degree of change, to be good (○) or unsatisfactory (Δ). As the quantitative standard, test samples in which the thickness of the oxide film after 1,000 hours was three times or more the thickness of the oxide film in the initial stage (before the test) were considered to be poor (X) regardless of the change in the appearance.

In "comprehensive evaluation", these items were comprehensively evaluated and rated to be excellent (⊚), good (○), unsatisfactory (Δ), or poor (X).

The details of Examples 1 to 6 and Comparative Examples 1 to 5 will be described below.

Example 1

A plate composed of pure Cu (tough pitch copper; hereinafter referred to as TPC) with a thickness of 0.5 mm was prepared. A coating layer composed of zinc with a thickness of 0.002 μm was formed by electrolytic plating on the surface of the plate, and then, heat treatment was performed in the air at 50° C. for 10 minutes. Thereby, a copper-based material provided with a surface treatment layer was produced. By conducting Auger analysis on the resulting copper-based material in the depth direction from the surface, it was confirmed that a surface treatment layer composed of two or three elements selected from the group consisting of zinc (Zn), oxygen (O), and copper (Cu) was formed at a thickness of 0.003 μm.

Example 2

In Example 2, a plate composed of TPC with a thickness of 0.5 mm was prepared. A Zn layer with a thickness of 0.005 μm was formed by electrolytic plating on the surface of the plate, and then, heat treatment was performed in the air at 50° C. for one hour. Thereby, a copper-based material was produced. By conducting Auger analysis on the resulting copper-based material in the depth direction from the surface, it was confirmed that a surface treatment layer composed of two or three elements selected from the group consisting of zinc (Zn), oxygen (O), and copper (Cu) was formed at a thickness of 0.006 μm.

Example 3

In Example 3, a plate composed of TPC with a thickness of 0.5 mm was prepared. A Zn layer with a thickness of 0.008 μm was formed by electrolytic plating on the surface of the plate, and then, heat treatment was performed in the air at 100° C. for 5 minutes. Thereby, a copper-based material was produced. By conducting Auger analysis on the resulting copper-based material in the depth direction from the surface, it was confirmed that a surface treatment layer composed of two or three elements selected from the group consisting of zinc (Zn), oxygen (O), and copper (Cu) was formed at a thickness of 0.01 μm.

Example 4

In Example 4, a plate composed of TPC with a thickness of 0.5 mm was prepared. A Zn layer with a thickness of 0.04 μm was formed by electrolytic plating on the surface of the plate, and then, heat treatment was performed in the air at 120° C. for 10 minutes. Thereby, a copper-based material was produced. By conducting Auger analysis on the resulting copper-based material in the depth direction from the surface, it was confirmed that a surface treatment layer composed of two or three elements selected from the group consisting of zinc (Zn), oxygen (O), and copper (Cu) was formed at a thickness of 0.05 μm.

Example 5

In Example 5, a plate composed of TPC with a thickness of 0.5 mm was prepared. A Zn layer with a thickness of 0.08 μm was formed by electrolytic plating on the surface of the plate, and then, heat treatment was performed in the air at 150° C. for 30 seconds. Thereby, a copper-based material was produced. By conducting Auger analysis on the resulting copper-based material in the depth direction from the surface, it was confirmed that a surface treatment layer composed of two or three elements selected from the group consisting of zinc (Zn), oxygen (O), and copper (Cu) was formed at a thickness of 0.1 μm.

Example 6

In Example 6, a plate composed of TPC with a thickness of 0.5 mm was prepared. A Zn layer with a thickness of 0.45 μm was formed by electrolytic plating on the surface of the plate, and then, heat treatment was performed at 150° C. for 30 seconds. Thereby, a copper-based material was produced. By conducting Auger analysis on the resulting copper-based material in the depth direction from the surface, it was confirmed that a surface treatment layer composed of two or three elements selected from the group consisting of zinc (Zn), oxygen (O), and copper (Cu) was formed at a thickness of 0.5 μm.

Comparative Example 1

In Comparative Example 1, a plate composed of TPC with a thickness of 0.5 mm was prepared. A Zn layer with a thickness of 0.95 μm was formed by electrolytic plating on the surface of the plate, and then, heat treatment was performed in the air at 100° C. for 5 minutes. Thereby, a copper-based material was produced. By conducting Auger analysis on the resulting copper-based material in the depth direction from the surface, it was confirmed that a surface treatment layer composed of two or three elements selected from the group consisting of zinc (Zn), oxygen (O), and copper (Cu) was formed at a thickness of 1 μm.

Comparative Example 2

In Comparative Example 2, a plate composed of TPC with a thickness of 0.5 mm was prepared. A Zn layer with a thickness of 0.02 μm was formed by electrolytic plating on the surface of the plate. Thereby, a copper-based material was produced.

Comparative Example 3

In Comparative Example 3, a plate composed of TPC with a thickness of 0.5 mm was prepared. A Zn layer with a thickness of 0.01 μl was formed by electrolytic plating on the surface of the plate, and then, heat treatment was performed at 400° C. for 30 seconds. Thereby, a copper-based material was produced. By conducting Auger analysis on the resulting copper-based material in the depth direction from the surface, it was confirmed that a surface treatment layer composed of two or three elements selected from the group consisting of zinc (Zn), oxygen (O), and copper (Cu) was formed at a thickness of 0.02 μm.

Comparative Example 4

In Comparative Example 4, a plate composed of TPC with a thickness of 0.5 mm was used as a sample for evaluation.

Comparative Example 5

In Comparative Example 5, a plate composed of a Cu-30 mass % Zn alloy (brass) with a thickness of 0.5 mm was used as a sample for evaluation.

Figure 3:
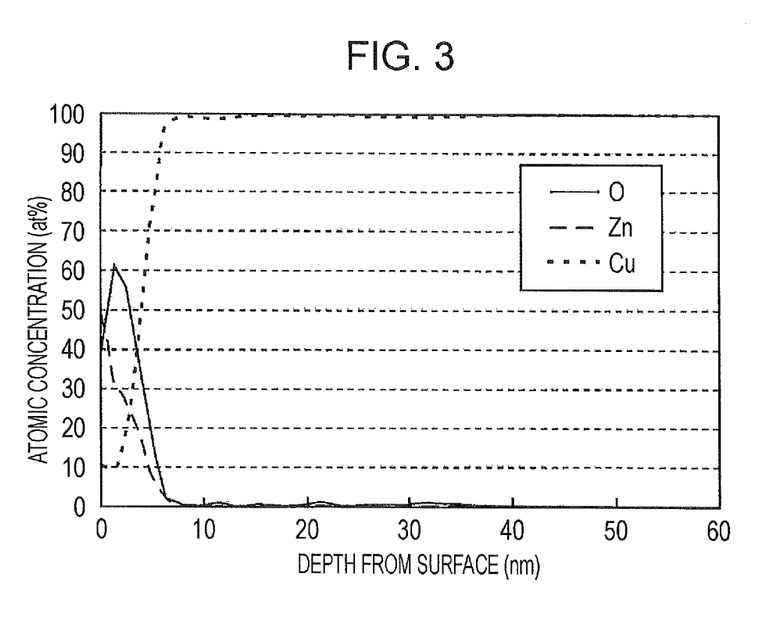
FIG. 3 is a graph showing the results of Auger elemental analysis of a test sample of a copper-based material of Example 3 of the present invention subjected to an isothermal (100° C.) holding test for 1,000 hours, in which the elemental analysis was conducted in the depth direction from the surface layer while repeatedly performing sputtering.

FIG. 3 is a graph showing the results of Auger elemental analysis of the test sample of the copper-based material of Example 3 subjected to an isothermal (100° C.) holding test for 1,000 hours, in which the elemental analysis was conducted in the depth direction from the surface layer while repeatedly performing sputtering. The horizontal axis indicates the depth (nm) from the surface, and the vertical axis indicates the atomic concentration (at %). The solid line represents the atomic concentration (at %) of oxygen (i.e., oxygen content), the long-dashed line represents the atomic concentration of zinc, and the short-dashed line represents the atomic concentration of copper. The oxygen penetration depth was about 8 nm from the surface. In particular, when the average element content is defined by the formula: (Maximum atomic concentration for each element at depth of 0 to 3 nm−Minimum atomic concentration)/2, in Example 3, the average of zinc (Zn) content was 37 atomic percent, the average oxygen (O) content was 50 atomic percent, and the average copper (Cu) content was 13 atomic percent.

Furthermore, when other examples were also taken into consideration, the average zinc (Zn) content was in the range of 35 to 68 atomic percent, the average oxygen (O) content was in the range of 30 to 60 atomic percent, and the average copper (Cu) content was in the range of 0 to 15 atomic percent.

On the other hand, in the copper-based material of Comparative Example 1, the zinc (Zn) content was 33 atomic percent, the oxygen (O) content was 41 atomic percent, and the copper (Cu) content was 26 atomic percent. In the copper-based material of Comparative Example 5, the zinc (Zn) content was 5 atomic percent, the oxygen (O) content was 46 atomic percent, and the copper (Cu) content was 49 atomic percent.

Figure 4:
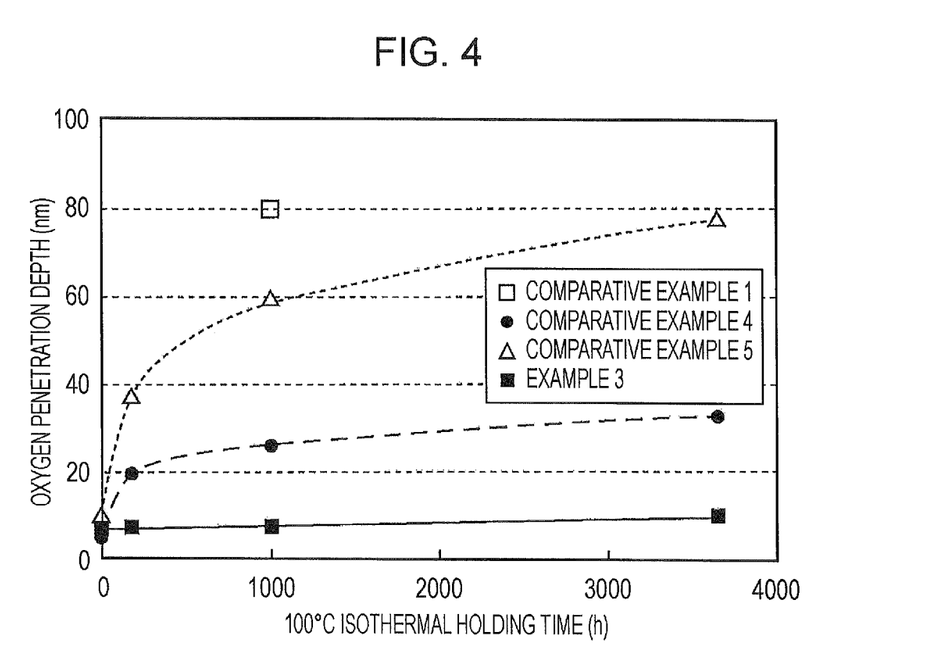
FIG. 4 is a graph showing a change in the oxygen penetration depth from the surface layer (thickness of the oxide film) with time in an isothermal (100° C.) holding test on copper-based materials of Example 3 of the present invention and Comparative Example 4.

FIG. 4 is a graph showing a change in the oxygen penetration depth from the surface layer (thickness of the oxide film) with time in the isothermal (100° C.) holding test on the copper-based materials of Example 3 and Comparative Example 4. The oxygen penetration depth was determined by conducting Auger analysis in the depth direction from the surface of the sample held for a respective period of time while repeatedly performing sputtering. In FIG. 4, the horizontal axis indicates the 100° C. isothermal holding time (h), and the vertical axis indicates the oxygen penetration depth (nm). The solid line represents the oxygen penetration depth of Example 3, and the dashed lines represent the oxygen penetration depth of Comparative Examples 4 and 5. Comparative Example 1 is represented by a point.

In Example 3, as shown in FIG. 3, in the state after being held for 3,600 hours, although the oxygen concentration was increased in the vicinity of the surface, the penetration depth did not substantially change compared with that before the test at about 0.01 μm or less. Thus, the copper-based material of Example 3 exhibited high oxidation resistance.

On the other hand, as shown in FIG. 4, in Comparative Example 4 (tough pitch copper) and Comparative Example 5 before the isothermal holding test, the thickness of the layer containing oxygen was about 0.006 μm, which was about the same as that of Example 3 before the isothermal holding test. In comparative Example 4 after the 3,600-hour holding test, the oxygen concentration in the vicinity of the surface markedly increased compared to that before the isothermal holding test. Furthermore, the oxygen penetration depth of Comparative Example 4 was about 0.036 μm, which was 5 times or more that before the test, and the oxygen penetration depth of Comparative Example 5 was about 0.078 μm, which was 13 times that before the test. Furthermore, in Comparative Examples 4 and 5 after the test, discoloration to reddish brown occurred in the appearance, clearly indicating the formation of a thick layer containing oxygen. Furthermore, in Comparative Example 1 in which the Zn layer with a thickness of 0.95 μm was formed on the TPC plate, the oxygen penetration depth had already reached about 0.080 μm after the 1,000-hour holding test.

Figure 5:
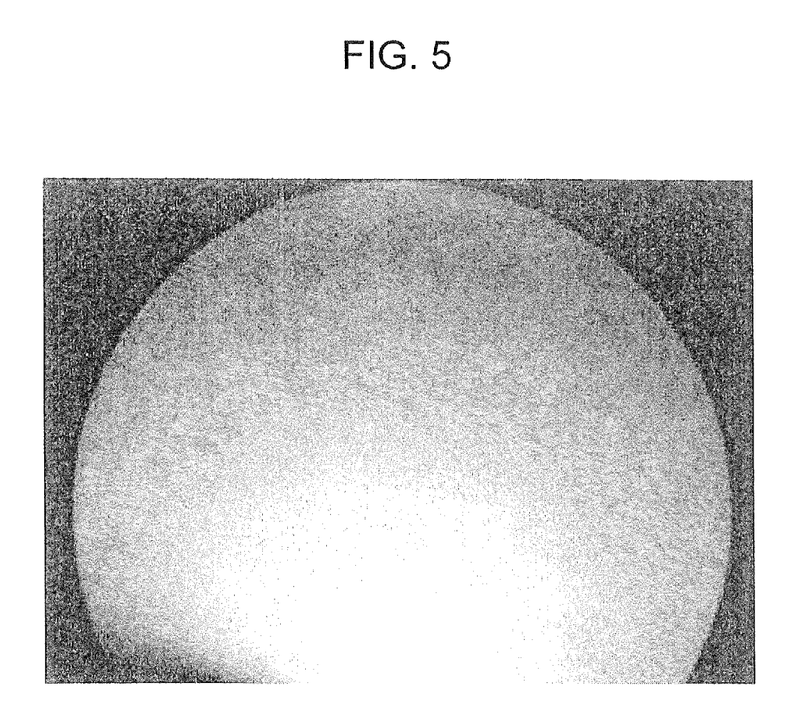
FIG. 5 shows an electron beam diffraction image obtained by RHEED analysis of a copper-based material according to an example of the present invention.

FIG. 5 shows the result of RHEED analysis of the surface of the copper-based material of Example 3 having excellent corrosion resistance. The electron beam diffraction image shows a halo pattern, which indicates the formation of an amorphous layer on the surface, as also shown in Table 1. On the other hand, the copper-based material of Comparative Example 4 having poor corrosion resistance was confirmed to have a crystalline structure composed of copper and oxygen.

Furthermore, according to Table 1, in the copper-based materials of Examples 1 to 6 having a surface treatment layer with various thickness, in the range of 0.003 to 0.5 μm, the surface treatment layer having the amorphous structure, the appearance and corrosion resistance were evaluated to be good. In particular, in the case where the thickness of the surface treatment layer was 0.006 to 0.05 μm, excellent characteristics were exhibited.

The results described above confirm that, in the structures shown in Examples 1 to 6, surface oxidation does not proceed, and the stable surface state is maintained even in an isothermal holding test (100° C.×1,000 hours) and in an environment of 85° C.×85%.

On the other hand, even in the copper-based materials of Comparative Examples 1 to 3 similarly having a Zn-based surface treatment layer, in some cases, good characteristics were not obtained. In the case where an amorphous layer was not formed in the surface layer, such as in Comparative Example 1 in which the zinc layer had a large thickness, in Comparative Example 2 in which heat treatment was not performed after plating, or in Comparative Example 3 in which heat treatment was excessively performed, the corrosion resistance was evaluated to be no good.

The results described above confirm that it is preferable to perform heat treatment in an atmosphere containing 1% or more of oxygen and at 50° C. or higher.

Regarding costs (economic efficiency), in Examples 1 to 6 of the present invention, without need of noble metal coating in which the material has excellent corrosion resistance but is expensive, inexpensive Zn is used and the thickness thereof is very small. Therefore, excellent productivity and economic efficiency can be obtained.

Judging comprehensively from the results described above, according to the present invention shown in Examples 1 to 6, it is possible to provide a copper-based material suitable for use as a copper-based decorative material or conductive material which has corrosion resistance (oxidation resistance) that withstands a long-term use in a high-temperature environment and in which an amorphous layer can be formed by a simple process, and a method for producing the same. Furthermore, according to the present invention, it is possible to obtain a copper-based decorative material or conductive material which has color and shine originating from a copper or copper alloy material and in which degradation due to surface oxidation is suppressed.

Furthermore, the copper or copper alloy serving as a core (base) is not limited to general tough pitch copper and oxygen-free copper. The present invention can also be applied to high-purity copper and the dilute copper alloys described above.

What is claimed is:

1. A copper-based material, comprising:
a base comprising oxygen-free copper, tough pitch copper, or dilute copper alloys containing 3 ppm to 15 ppm by mass of sulfur, 2 ppm to 30 ppm by mass of oxygen, and 5 ppm to 55 ppm by mass of Ti; and
a surface treatment layer directly disposed on an entirety of a surface of the base, the surface treatment layer consisting of an amorphous layer comprising oxygen and a metal having a higher oxygen affinity than copper, the metal consisting of zinc and a diffusion layer between the amorphous layer and the base, the diffusion layer comprising copper and zinc, or a diffusion layer comprising copper, zinc and oxygen.

2. The copper-based material according to claim 1, wherein the surface treatment layer has a thickness of 3.0 nm to 0.6 μm.

3. The copper-based material according to claim 1, wherein the diffusion layer has a thickness of 0.5 μm or less.

4. The copper-based material according to claim 1, wherein the surface treatment layer is formed in a heat treatment at a temperature of 50° C. to 150° C. for 30 seconds to 60 minutes.

5. The copper-based material according to claim 4, wherein the surface treatment layer has a thickness in a range of 3.0 nm to 0.6 μm.

6. The copper-based. material according to claim 4, wherein the heat treatment is performed in a range of 30 seconds to 60 minutes.

7. The copper-based material according to claim 1, wherein the surface treatment layer has a thickness of 3.0 nm to 0.5 μm.

8. The copper-based material according to claim 1, wherein the base comprises the oxygen-free copper.

9. The copper-based material according to claim 1, wherein the base comprises the dilute copper alloys.

10. The copper-based material according to claim 1, wherein the amorphous layer further comprises copper diffused from the base into the amorphous layer.

11. A copper-based material, comprising:
a base comprising copper; and
a surface treatment layer directly disposed on an entirety of a surface of the base, the surface treatment layer consisting of an amorphous layer comprising oxygen and a metal having a higher oxygen affinity than copper, the metal consisting of zinc and a diffusion layer between the amorphous layer and the base, the diffusion layer comprising copper and zinc, or a diffusion layer comprising copper, zinc and oxygen.

* * * * *